United States Patent
Labelle et al.

(10) Patent No.: US 7,953,798 B2
(45) Date of Patent: May 31, 2011

(54) DATA SHARING SEQUENCE DISPLAY METHOD AND CORRESPONDING SHARING DEVICE

(75) Inventors: Lilian Labelle, St. Pierre de Plesguen (FR); Eric Nassor, Thorigne Fouillard (FR)

(73) Assignee: Canon Kabushiki Kaisha, Tokyo (JP)

( * ) Notice: Subject to any disclaimer, the term of this patent is extended or adjusted under 35 U.S.C. 154(b) by 1359 days.

(21) Appl. No.: 11/220,535

(22) Filed: Sep. 8, 2005

(65) Prior Publication Data

US 2006/0053207 A1    Mar. 9, 2006

(30) Foreign Application Priority Data

Sep. 8, 2004    (FR) ...................................... 04 09515

(51) Int. Cl.
*G06F 15/16* (2006.01)
*H04L 12/66* (2006.01)
*H04J 3/22* (2006.01)

(52) U.S. Cl. ........ 709/205; 709/203; 709/206; 709/219; 709/231; 370/366; 370/466

(58) Field of Classification Search .................. 709/203, 709/206, 219, 231; 725/45–48, 50, 53, 55, 725/56, 105, 25; 348/14.02, 211.2, 231.3, 348/231.9; 358/1.15; 463/40; 370/466
See application file for complete search history.

(56) References Cited

U.S. PATENT DOCUMENTS

| | | | | |
|---|---|---|---|---|
| 6,161,131 A * | 12/2000 | Garfinkle | ...................... | 709/206 |
| 6,724,416 B1 * | 4/2004 | Liu | ............................. | 348/14.02 |
| 6,748,402 B1 * | 6/2004 | Reeves et al. | .......................... | 1/1 |
| 7,173,651 B1 * | 2/2007 | Knowles | .................... | 348/207.1 |
| 7,177,881 B2 * | 2/2007 | Schwesig et al. | .......... | 707/104.1 |
| 2002/0135671 A1 * | 9/2002 | Yang | .......................... | 348/14.01 |
| 2002/0149705 A1 * | 10/2002 | Allen et al. | ................... | 348/734 |
| 2002/0191639 A1 * | 12/2002 | Norby | ............................ | 370/466 |
| 2003/0030731 A1 | 2/2003 | Colby | ........................ | 348/231.3 |

(Continued)

FOREIGN PATENT DOCUMENTS

WO        WO 9934600 A1 *    7/1999

OTHER PUBLICATIONS

U.S. Appl. No. 10/833,127, filed Apr. 28, 2004.

*Primary Examiner* — Carl Colin
*Assistant Examiner* — Peter Shaw
(74) *Attorney, Agent, or Firm* — Fitzpatrick, Cella, Harper & Scinto

(57) ABSTRACT

The present invention discloses a method of displaying a sequence for sharing digital data items with a set of recipients using a terminal capable of using at least two communication modes for communicating with the recipients. The method comprises the steps of obtaining a first list of recipients communicating with the terminal according to a first communication mode, obtaining at least one second list of recipients communicating with the terminal according to a second communication mode, displaying on the mobile terminal a representation of each recipient in the lists thus obtained, selecting at least one representation, determining the communication mode to be used according to the representation selected and sending data item to the recipient whose representation was selected according to the determined communication mode. The invention also describes a sharing device adapted to implement the method, in particular a digital camera.

20 Claims, 11 Drawing Sheets

U.S. PATENT DOCUMENTS

| | | |
|---|---|---|
| 2003/0058478 A1 | 3/2003 | Aoki .............................. 358/402 |
| 2003/0114224 A1* | 6/2003 | Anttila et al. ................... 463/40 |
| 2003/0197788 A1 | 10/2003 | Parulski et al. ............ 348/211.2 |
| 2003/0233467 A1* | 12/2003 | Ogasawara ................... 709/232 |
| 2004/0021781 A1* | 2/2004 | Iida ............................ 348/231.3 |
| 2004/0041923 A1* | 3/2004 | Iida ............................ 348/231.9 |
| 2004/0053637 A1* | 3/2004 | Iida ............................ 455/550.1 |
| 2004/0201709 A1* | 10/2004 | McIntyre et al. .......... 348/211.2 |
| 2005/0175021 A1* | 8/2005 | Ozugur et al. ................ 370/401 |
| 2005/0213147 A1* | 9/2005 | Minatogawa ................ 358/1.15 |

* cited by examiner

DATA SHARING SEQUENCE DISPLAY METHOD AND CORRESPONDING SHARING DEVICE

BACKGROUND OF THE INVENTION

The present invention relates to a method of displaying a digital data sharing sequence using a mobile terminal and a mobile sharing device capable of using at least two communication modes for this data sharing.

The invention applies in particular to data sharing in a "point to point" or distributed communication network, commonly referred to as a "peer to peer" topology communication network.

The invention relates in particular to a mobile terminal of digital camera or portable telephone type having a capability of obtaining digital images.

Point to point networks have become an alternative to client/server networks which are widespread nowadays for data sharing on the Internet. This is because, through their distributed architecture, point to point networks make it possible to share a large number of digital data items between a large number of users without requiring an expensive infrastructure.

In practice, in a point to point network, each terminal acts as client and server. Thus, each terminal can request a digital data item or document from any other terminal on the network and the data exchange can be carried out directly from one terminal to another.

Hereinafter, the term "digital data item or document" applies to both digital videos and images, or also to texts or graphics.

The term "version" of a data item will designate the data item at a particular resolution. The original data item will have the highest resolution and the same data item at a lower resolution will be referred to as a thumbnail image. In the case where the digital data item is an image, the original data item will correspond to the original image, that is to say at full resolution, and the thumbnail image will correspond to a lower resolution image. In the case where the data item is a video, the original data item will correspond to the sequence of original images and the thumbnail image will correspond, for example, to the first image of the video at a resolution lower than the resolution of the original video.

Thus, in a point to point data exchange, each terminal can be both client and server.

This means that the digital data received by a client can be sent to other users by the server of this client.

The sharing of a digital data item can also be carried out using a mobile terminal of the latest generation mobile telephone or digital camera type, that is to say an apparatus having at least one wireless communication means.

As these apparatuses have limited calculation capabilities and short duration connection times to the point to point network, they cannot act as a server. Hereinafter, the term thin terminal or mobile terminal will be used to designate this type of apparatus.

Thus, using a thin terminal, a user can create a photograph, and share this photograph with a friend by sending him a thumbnail image of this photograph in order to limit the transfer cost of sharing the image. The original version of this photograph will be accessible by this friend only once the user has synchronized his apparatus with a terminal capable of acting as a server (in general his personal microcomputer).

This synchronization step will consist of uploading the original version of the shared image and of linking this version with the previously sent thumbnail image. Thus, this server terminal can deliver this original version of the image as soon as this friend or any other remote user so requests.

Sharing a digital data item using a thin terminal requires means for selecting the data item and means for selecting the recipients. Selection of the data items depends greatly on the apparatus used. For example, a digital camera makes it possible to linearly run through the photographs stored on the memory card using four buttons, Up/Down/Left/Right. Once the image has been selected, a confirmation button "SET" is actuated.

Selection of the recipients is conventionally carried out by running through a list by means of the Up/Down buttons and selecting the chosen recipient from a mobile telephone phone book. This list, or more exactly this address book, can contain telephone or fax numbers or electronic (e-mail) addresses.

Once a recipient has been selected in this way, the thin terminal creates the message and sends it.

If the thin terminal is equipped with a wireless connection, for example a Wi-Fi® (Wireless Fidelity) certified connection, the user can connect to an "Access Point" close to him on a structured network or to any other terminal possessing the same functionality and situated in proximity (ad hoc network).

Using a structured network, the user can have access to an Internet type external network and can have access to Web services such as a messaging system service using which he can send electronic mail (e-mail) or an MMS (Multimedia Messaging Services) type message to a person of his choice. Using an ad hoc network, he can send his message directly to the apparatus of a friend.

However, if the user of the thin terminal wishes to share digital data items with a set of recipients both by means of the structured network and by means of the ad hoc network, he must carry out several operations for each transmission mode. He cannot carry out the sharing in a single step and in a simple manner.

Even though there exist many communication apparatuses capable of communicating according to different communication modes (cameras, mobile telephones, PDAs, etc), interfaces facilitating sharing with many recipients communicating with the apparatus by different communication modes are not provided.

One of the most advanced systems is described in the patent application U.S. 2003058478 entitled "Communication apparatus provided with electronic address book".

This patent application describes a communication apparatus capable of communicating according to several communication modes. An address book is associated in memory with each transmission mode. When a user wishes to send a data item, the user determines the communication mode. The apparatus then determines the corresponding address book which is displayed on a graphical interface.

The communication apparatus described in this document of the prior art contains previously stored address books. Dynamic creation of addresses for sending data items is not provided.

SUMMARY OF THE INVENTION

The present invention aims to remedy the aforementioned drawbacks.

To that end, the invention provides a graphical interface which allows the user to share digital data items with many recipients according to different communication modes, in a simplified manner.

The invention also provides the ability to dynamically create an address book of accessible recipients for a mobile terminal.

To that end, the present invention relates to a method of displaying a sequence for sharing digital data items with a set of recipients using a terminal capable of using at least two communication modes for communicating with the recipients. The method comprises the following steps:
- obtaining a first list of recipients communicating with the terminal according to a first communication mode;
- obtaining at least one second list of recipients communicating with the terminal according to a second communication mode;
- displaying on the terminal a representation of each recipient in the lists thus obtained;
- selecting at least one representation;
- determining the communication mode to be used according to the representation selected;
- sending data item to the recipient whose representation was selected according to the determined communication mode.

Thus, data sharing with recipients communicating according to different communication modes is simplified. Moreover, the list of selectable recipients is updated each time data are shared, which makes it possible to update this list dynamically.

In a particular embodiment, the first recipient list is obtained using a book of addresses and representations stored locally.

Thus, the addresses already known to the user are selectable and do not need to be rerecorded.

In a preferred embodiment, the step of obtaining the second recipient list comprises a step of searching for remote terminals accessible by the terminal.

Terminals or apparatuses in proximity to the terminal are thus taken into account in order to allow sharing of data on these apparatuses.

In a preferred embodiment, the step of obtaining the second list comprises a step of obtaining the representation of the remote terminal accessible by the terminal.

This is in order to offer the user an easier interface.

In a preferred manner, the representation can be of the type of a photograph or illustration of the corresponding recipient or a photograph or illustration of an apparatus used by the corresponding recipient.

In a particular embodiment, the first communication mode is of messaging system type on an Internet type network.

In a preferred embodiment, a recipient in the first and second lists is detected from the first list.

The invention also relates to a device for sharing digital data items with a set of recipients, the device being capable of using at least two communication modes for communicating with the recipients. The device comprises:
- means for obtaining a first list of recipients communicating with said device according to a first communication mode;
- means for obtaining at least one second list of recipients communicating with said device according to a second communication mode;
- means for displaying a representation of each recipient in the lists thus obtained;
- means for selecting at least one representation;
- means for determining the communication mode to be used according to the representation selected; and
- means for sending selected data items to the recipient whose visual representation was selected according to the determined communication mode.

The sharing device as defined above is particularly adapted to implementing the method according to the invention.

As the particular advantages and characteristics specific to the sharing device according to the invention are similar to those described above concerning the method according to the invention, they will not be repeated here.

The invention also concerns a digital camera comprising a sharing device according to the invention, and a computer program and an information storage means for implementing the method according to the invention.

Other particular features and advantages of the invention will emerge further in the following description.

BRIEF DESCRIPTION OF THE DRAWINGS

In the accompanying drawings, given by way of non-limiting examples.

DETAILED DESCRIPTION OF THE INVENTION

Figure 1:
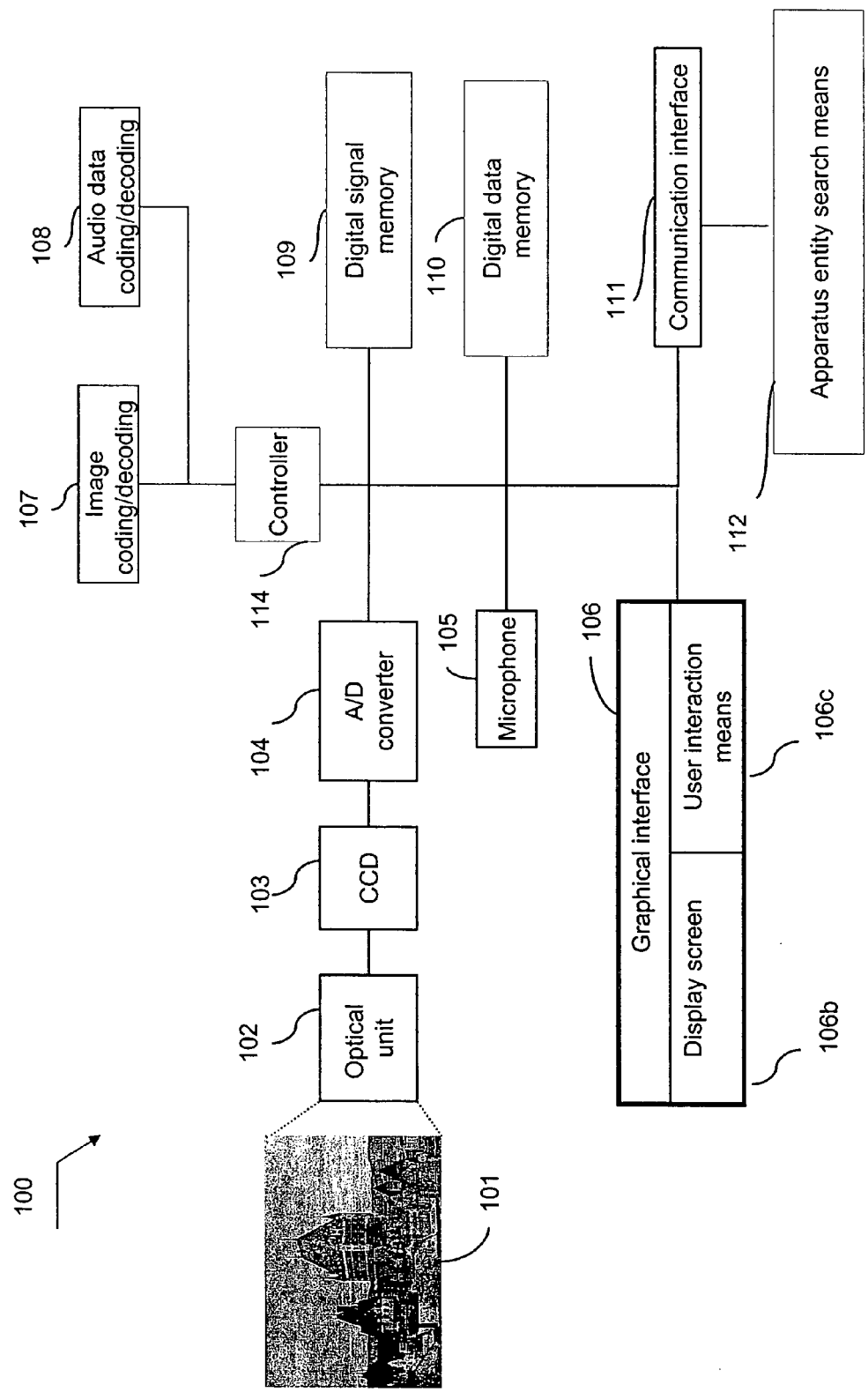
FIG. 1 depicts schematically a device implementing the invention.

There will be described first of all, with reference to FIG. 1, a digital data sharing device. This device is here a mobile or thin terminal for image and/or video capture, of the digital camera type. It is capable of implementing the data sharing sequence display method according to the invention and described later with reference to FIG. 2.

This device 100 comprises a digital data memory 110 and a digital signal memory 109 which can be combined in a single memory. The digital data memory 110 makes it possible to store, for example, the recipient addresses used in the invention and the program implementing the sharing sequence display method according to the invention.

The digital signal memory 109 makes it possible to store the images acquired by the image capture device or received thereby.

The memory 109 can be a removable memory unit, e.g., a computer-readable storage medium, such as a Flash memory or compact disk (CD).

The device 100 comprises a graphical interface 106 comprising a display screen 106b and user interaction means 106c. The display screen makes it possible to display one or more images, and to call up the graphical interface which will allow the user to implement a data sharing sequence in accordance with the invention. This graphical interface will be described later with reference to FIGS. 5 to 11.

The user interaction means allow the user to navigate in the graphical interface, to select the functions from a menu or images or visual representations. They also allow the user to enter the different modes of the camera and the digital signal coding/decoding parameters used by the coding/decoding units 107 and 108.

The device 100 consists of an image acquisition chain which comprises an optical unit 102 connected to a CCD sensor 103, itself connected to an analog to digital converter 104. It also consists of an image coding/decoding circuit 107, an audio signal coding/decoding circuit 108, a microphone 105 and a controller or microprocessor 114 which ensures the correct operation of the whole device.

The device 100 also comprises a communication interface 111, for example a type 802.11 (based on standard IEEE 802.11) and Wi-Fi certified wireless communication means. This communication interface makes it possible in the preferred embodiment of the invention to choose two communication modes.

A first communication mode is used when the communication is intended for an Internet type network. In this first communication mode, the type of message to be sent or received is in the form of electronic mail (e-mail) or an MMS (Multimedia Messaging Services) type message.

A second communication mode is used when the communication is intended for another apparatus also equipped with wireless communication means. In this case, the raw data are sent to the apparatus.

This communication interface is associated with apparatus entity search means 112 used for implementing the sharing sequence display method according to the invention. The use of these search means will be described later with reference to FIG. 3.

Prior to the sharing of digital data, a first list of addresses of potential recipients is recorded in memory in the device 100. The recipients in this first list communicate via the Internet by messaging system and therefore use the first communication mode.

To obtain these addresses, the user connects the device 100 to a microprocessor for example on which there is installed a program making it possible to retrieve the list of addresses. This can be, for example, a list of the addresses in the address book of a messaging system. Thus, with each entry in this book there is associated a user name and an e-mail address. The user associates an icon or image with each of the entries through the graphical interface 106 of the device 100 so as to form a user entity.

Thus, the device 100 has in memory a list of user entities. It will then be capable of carrying out data sharing and of displaying this sharing sequence in accordance with the invention.

In general terms, an information storage means, readable by a computer or by a microprocessor, and possibly partially or totally removable, is adapted to store a program implementing the sharing sequence display method according to the invention. This storage means is readable by the device described previously.

Moreover, one or more sequences of computer-executable program comprising one or more sequences of instructions that, when executed by a computer or a microprocessor, cause the computer or microprocessor, respectively, to perform a sharing sequence display method according to the invention.

It should be noted that the digital camera illustrated in FIG. 1 constitutes a particular embodiment of the invention.

Figure 2:
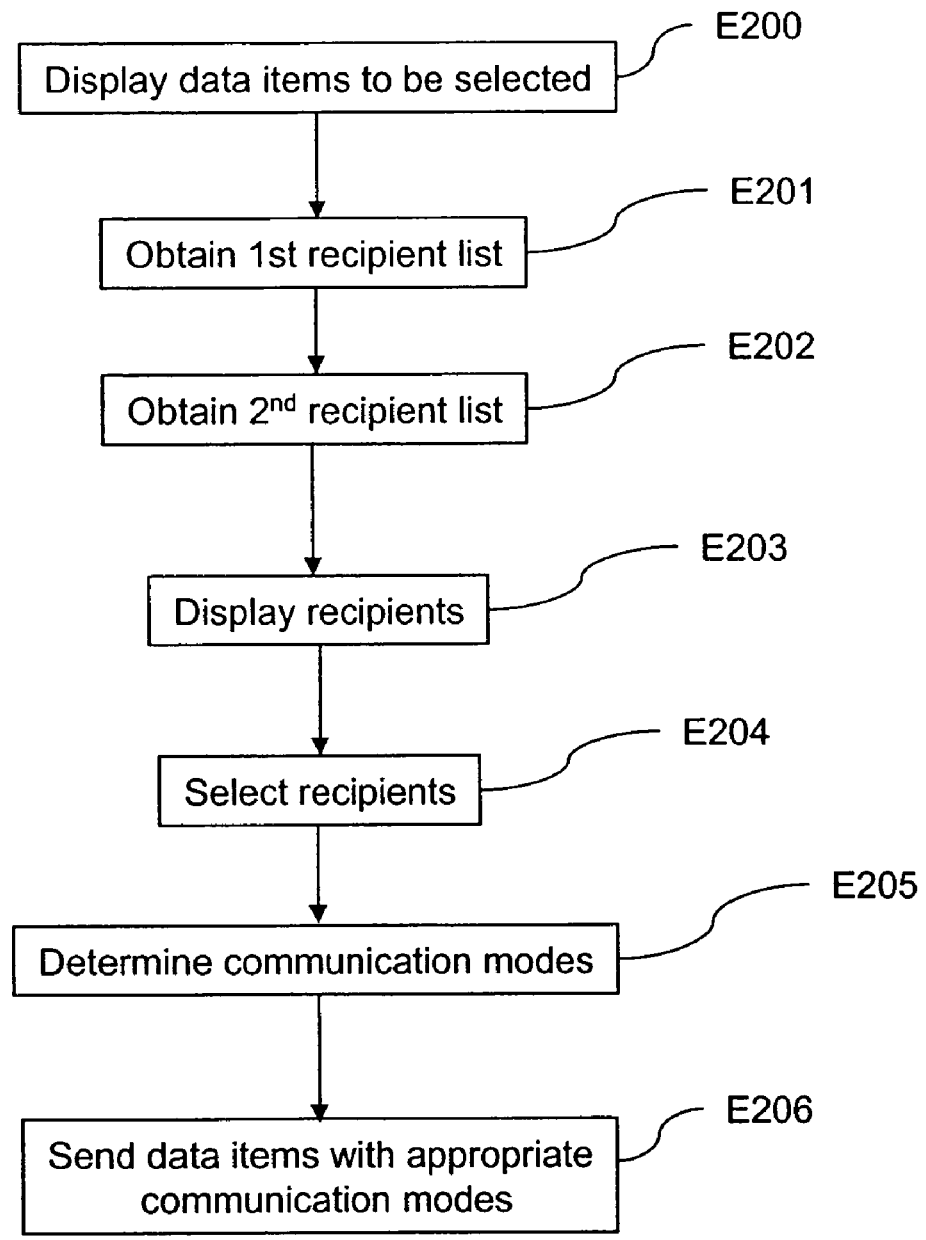
FIG. 2 depicts a flow diagram illustrating the steps of the data sharing sequence display method according to the invention.

With reference to FIG. 2, there will now be described a flow diagram depicting the steps of the data sharing sequence display method according to the invention.

The step E200 is a data display step for selecting the data items to be shared. The graphical interface allowing the display of the data items to be shared and the steps to be implemented for selecting the images thus displayed will be described later with reference to FIGS. 5 to 7.

The images thus selected are the data items that the user wishes to share or send.

At the step E201, a first recipient list is obtained. This first list consists of recipients communicating with the device 100 according to a first communication mode. They form part of an Internet type communication network as described in FIG. 1. This first list has been constituted as described in FIG. 1, and is stored in the apparatus in the form of user entities. This step E201 consists of displaying the recipients in this first list.

At the step E202, a second recipient list is obtained. For this, the method implements the steps described later in FIG. 3.

Figure 9:
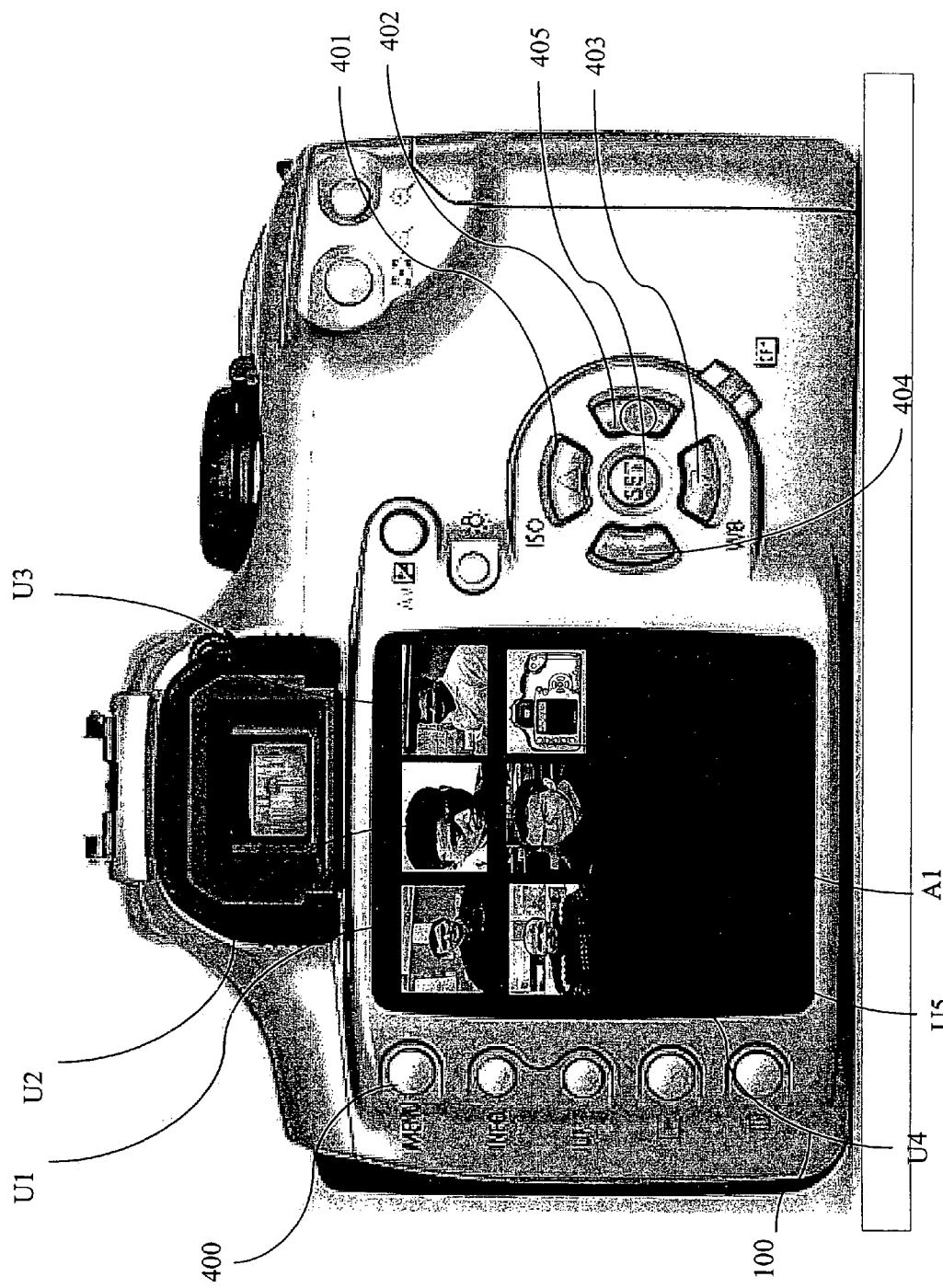

The recipients in the second list and those in the first list are displayed at the step E203, as shown by the graphical interface illustrated in FIG. 9.

Figure 10:
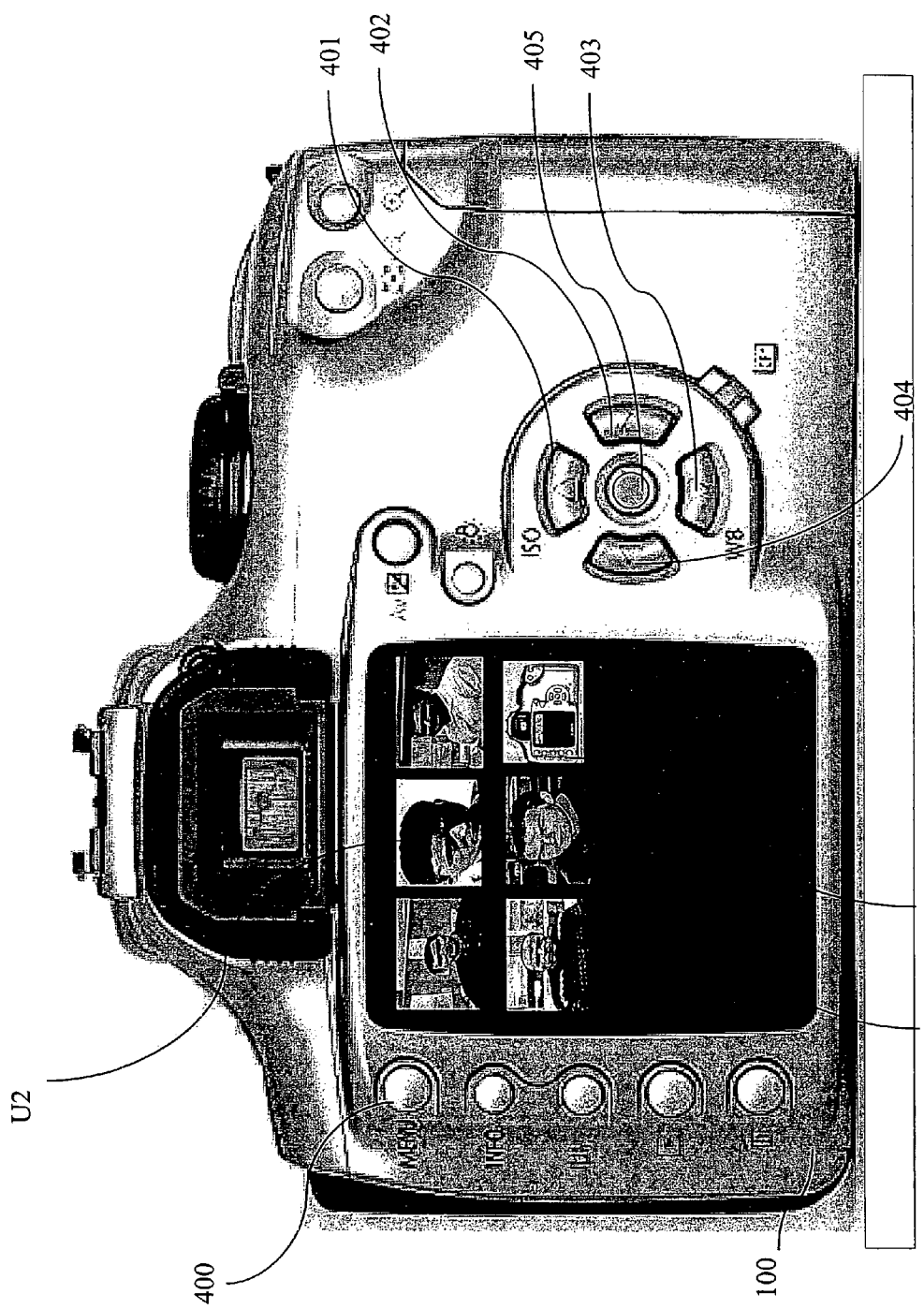
Figure 11:
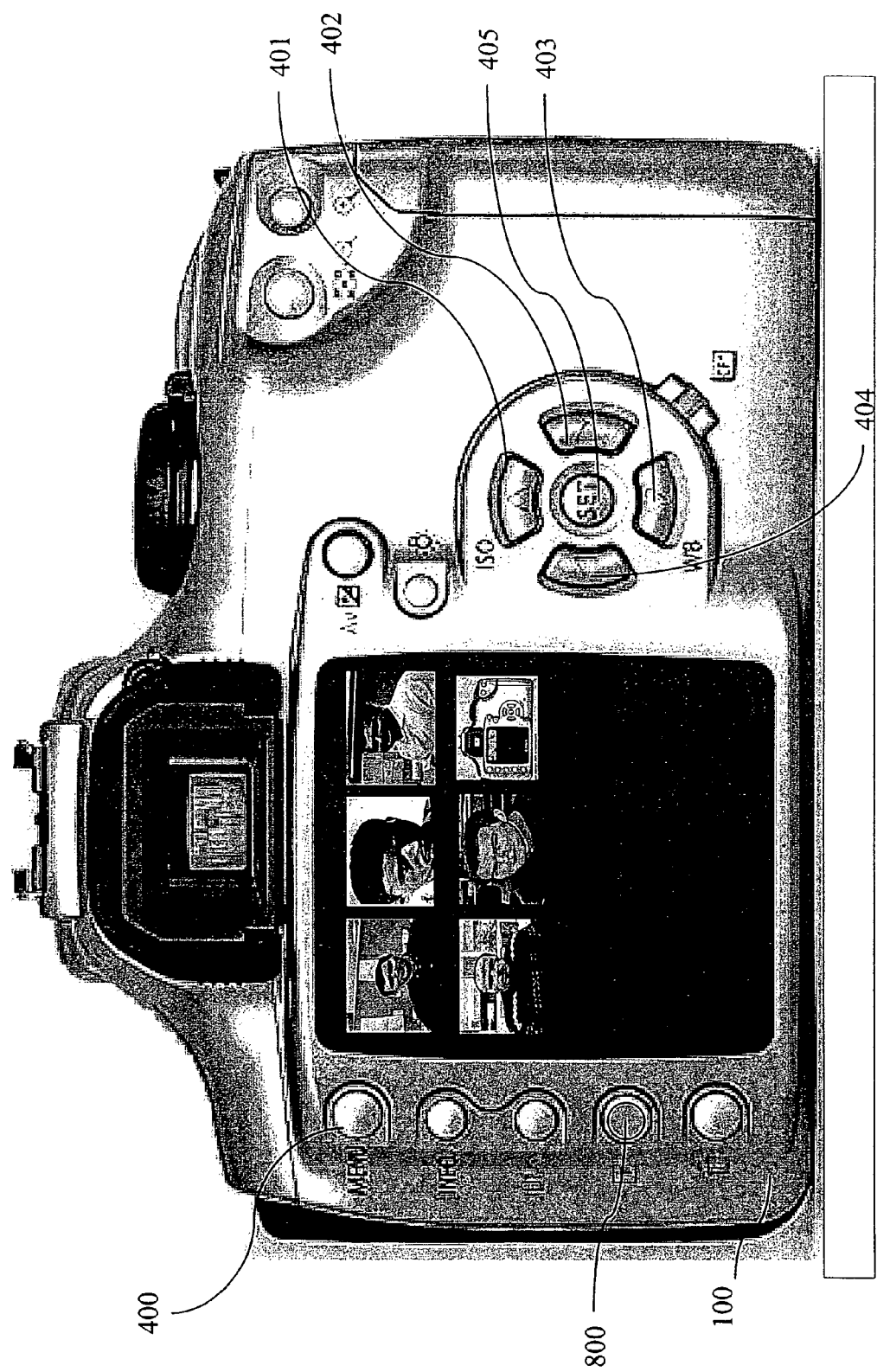

The step E203 is followed by the step E204, where the user selects the recipients thus displayed by means of the graphical interface depicted in FIG. 10. For this, he selects visual representations of these recipients.

Next, the method continues with the step E205 of determining communication modes to be used according to the selected recipients and the step E206 of sending the data items to be shared.

These steps E205 and E206 will be described in more detail with reference to FIG. 4.

Figure 3:
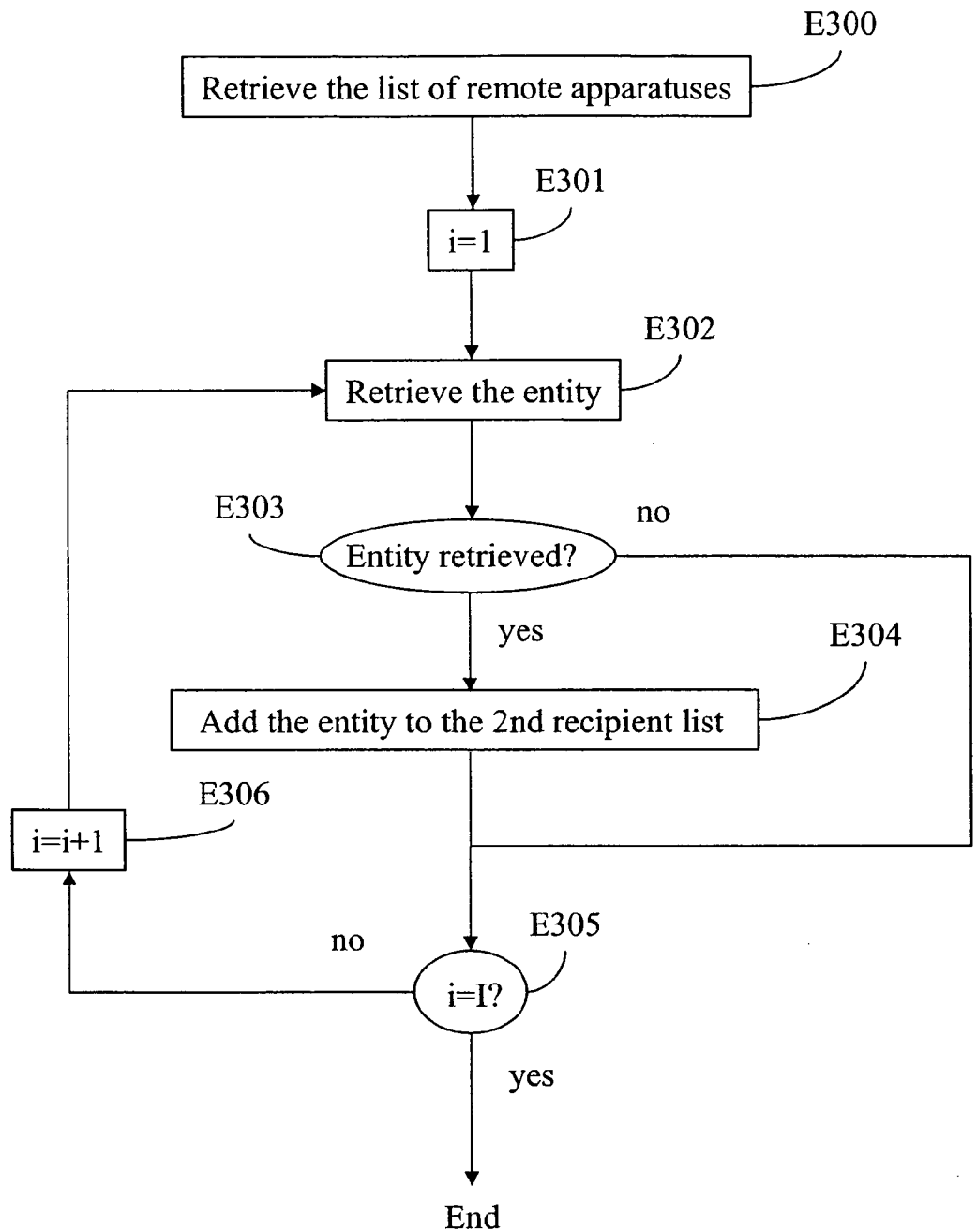
FIG. 3 depicts a flow diagram illustrating the steps of dynamic creation of an address book used in the invention.

FIG. 3 depicts, in the form of an algorithm, the steps implemented in order to obtain the second recipient list (E202). These steps thus allow the dynamic creation of the address book.

At the step E300, the device 100 retrieves a list of remote terminals which correspond to apparatuses, for example Wi-Fi certified apparatuses, capable of communicating with the device 100 by wireless means of type 802.11b, from the standard of the same name, in a preferred embodiment.

For that, the device initiates a conventional "ping/pong" type search mechanism. The device sends a message readable by any apparatus connected according to the Wi-Fi certification. When a remote apparatus receives this message (ping), it replies with a message (pong). In this way, the mobile terminal creates a list of remote terminals accessible by a wireless link conforming to Wi-Fi. It stores this list in a memory 110. Once this list has been stored, according to a preferred embodiment, the steps E301 to E306 will make it possible to create the corresponding apparatus entities.

The step E301 initializes a counter making it possible to consider each of the connected remote apparatuses. At the step E302, the mobile terminal asks the remote apparatus for its apparatus identity, that is to say a visual representation of its apparatus or of its owner, and the identification of its owner. If this apparatus does not reply, the next apparatus is considered at the steps E305 and E306. If the apparatus replies and sends its entity, the identity of the owner is compared with the first recipient list. If the same person appears in the first recipient list, they are deleted from the first list. The new entity is recorded in the memory 110 of the mobile terminal. The step E305 checks whether the current apparatus is the last in the list of remote apparatuses. If this is not the case, the step E306 considers the next apparatus and the method continues with the step E302 described previously. If the current apparatus is the last processed, the step E202 for obtaining the second recipient list of FIG. 2 is finished.

Figure 4:
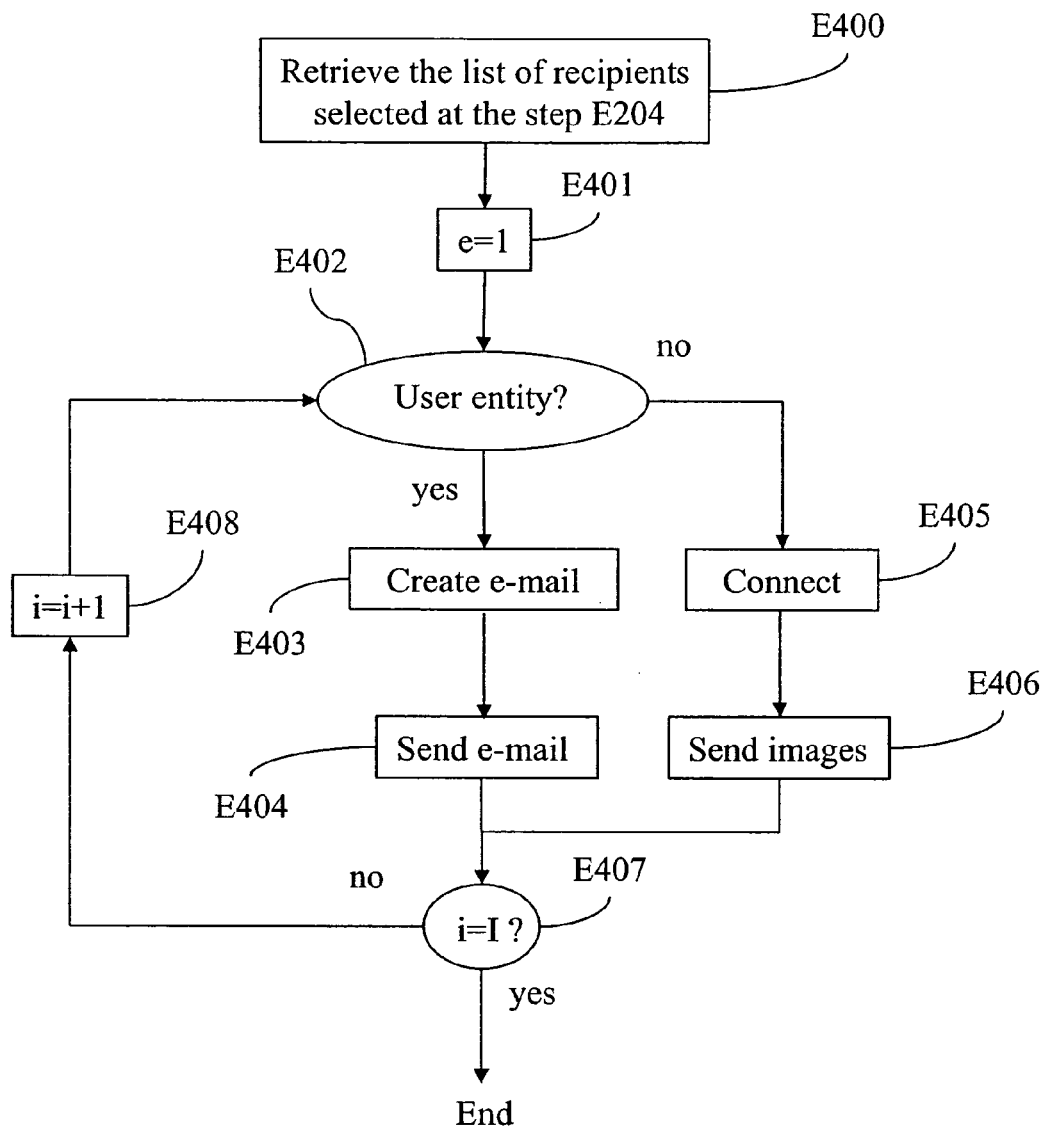
FIG. 4 depicts a flow diagram illustrating the steps of determining communication modes and of sending data items to be shared in accordance with the invention.

With reference to FIG. 4, there will now be described the steps E205 and E206 for determining communication modes and for sending data items to be shared. For this, at the step E400, the recipients who were selected as being the recipients of the data items to be sent are taken into account.

Using the visual representations of these recipients, the user, by means of the graphical interface, selects some of the recipients. These recipients can belong to the first or second recipient list. They can therefore communicate with the device by the first communication made or by the second communication mode.

At the step E401, an entity counter is initialized. Thus, for the current entity, the step E401 is followed by the step E402 where it is checked whether the current entity is a user entity in the first recipient list or an apparatus entity in the second recipient list.

In the case where the entity is a user entity, the step E402 is followed by the step E403 where the e-mail address of the recipient of the current entity is retrieved from the address book. An e-mail type message is thus created, comprising the images to be shared. At the step E404, the message is sent to the recipient of the current entity according to the first communication mode.

Where the apparatus is not connected to the network (the Internet) allowing the message to be sent, the message is temporarily stored locally, in order to be sent as soon as the apparatus is connected.

In the case where the current entity is an apparatus entity, the step E402 is followed by the step E405, where the device 100 retrieves the connection information for the remote apparatus corresponding to the apparatus entity.

This information was retrieved and stored during the "ping/pong" search mechanism.

With this information, the mobile terminal connects to the apparatus and sends, raw, the data items to be shared. The step E407 checks that the final entity has been processed. If this is not the case, the process goes to the next entity (step E408) and reiterates the previous steps. If the final entity has been processed, the display method according to the invention is finished.

The graphical interface corresponding to the data sharing sequence display method will now be illustrated with FIGS. 5 to 11.

Figure 5:
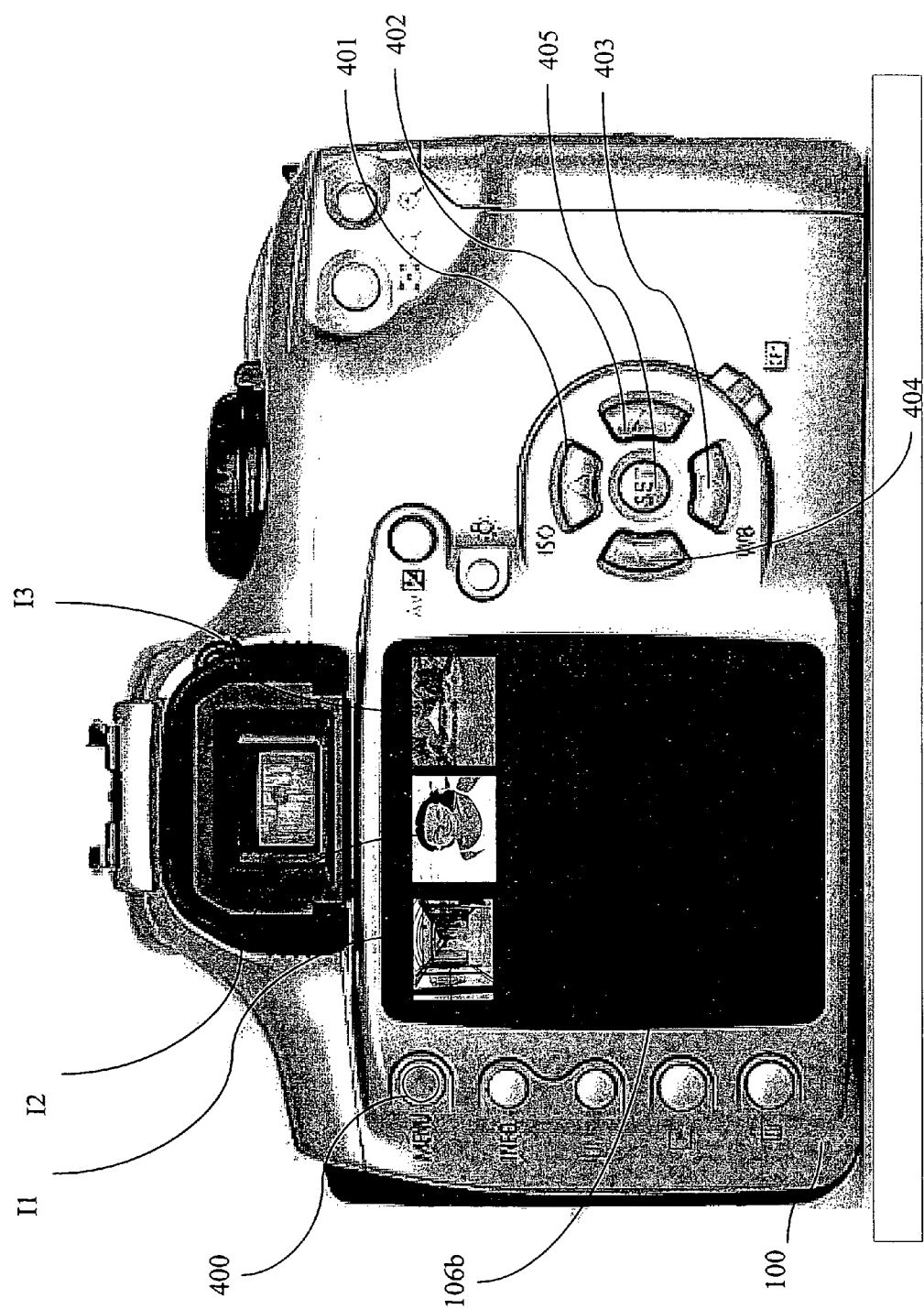
FIGS. 5 to 11 depict the graphical interface implemented according to the invention on a mobile terminal and illustrate the steps of the data sharing sequence display method according to the invention.
Figure 6:
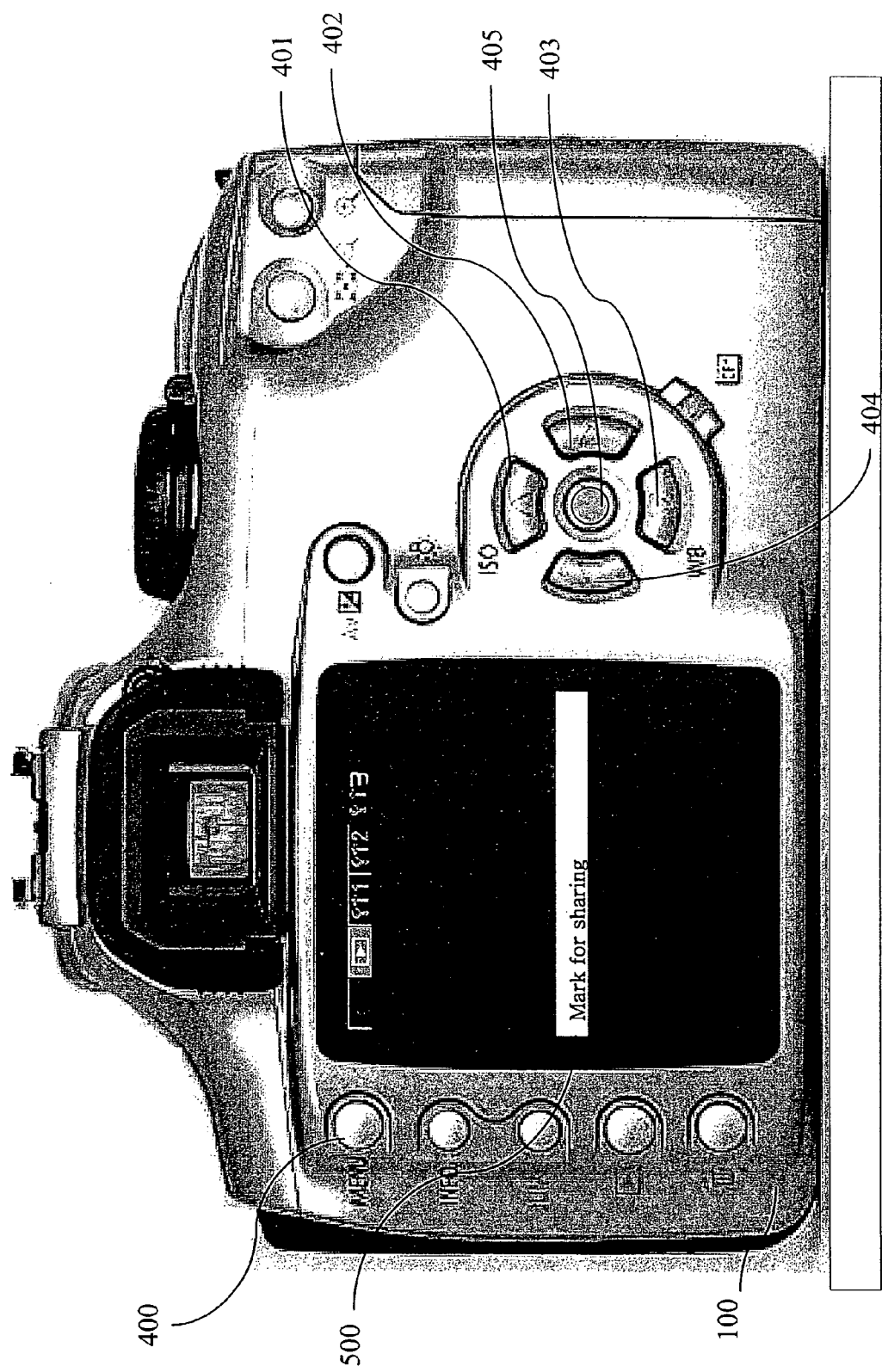

In FIG. 5, the display screen 106b of the camera 100 is depicted. Three images I1, I2 and I3 which have been captured by the camera or received thereby are depicted on the screen. A cursor in the form of a frame is placed over the image on which the user positions himself. The user can thus navigate over the images by pressing the buttons 401, 402, 403 and 404 in order to move the cursor respectively up, right, down and left.

To initiate image sharing, the user presses the menu button 400 in order to make various functions of the camera appear. Thus, in FIG. 6, a "Mark for sharing" function 500 allows selection of the images to be shared.

Once this function has been selected by means of the "SET" button 405, the display screen will allow display of the images to be selected.

Figure 7:
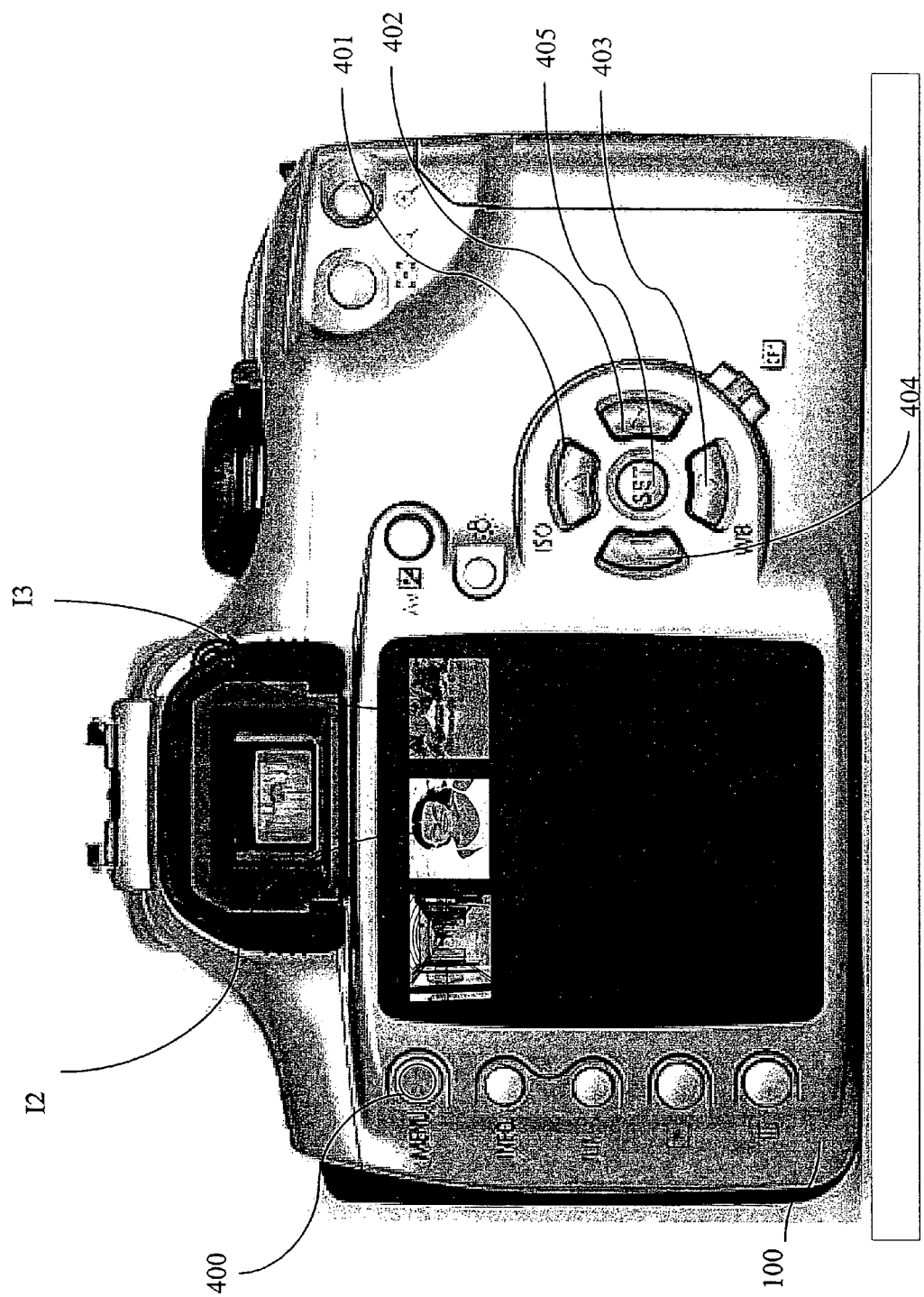
Figure 8:
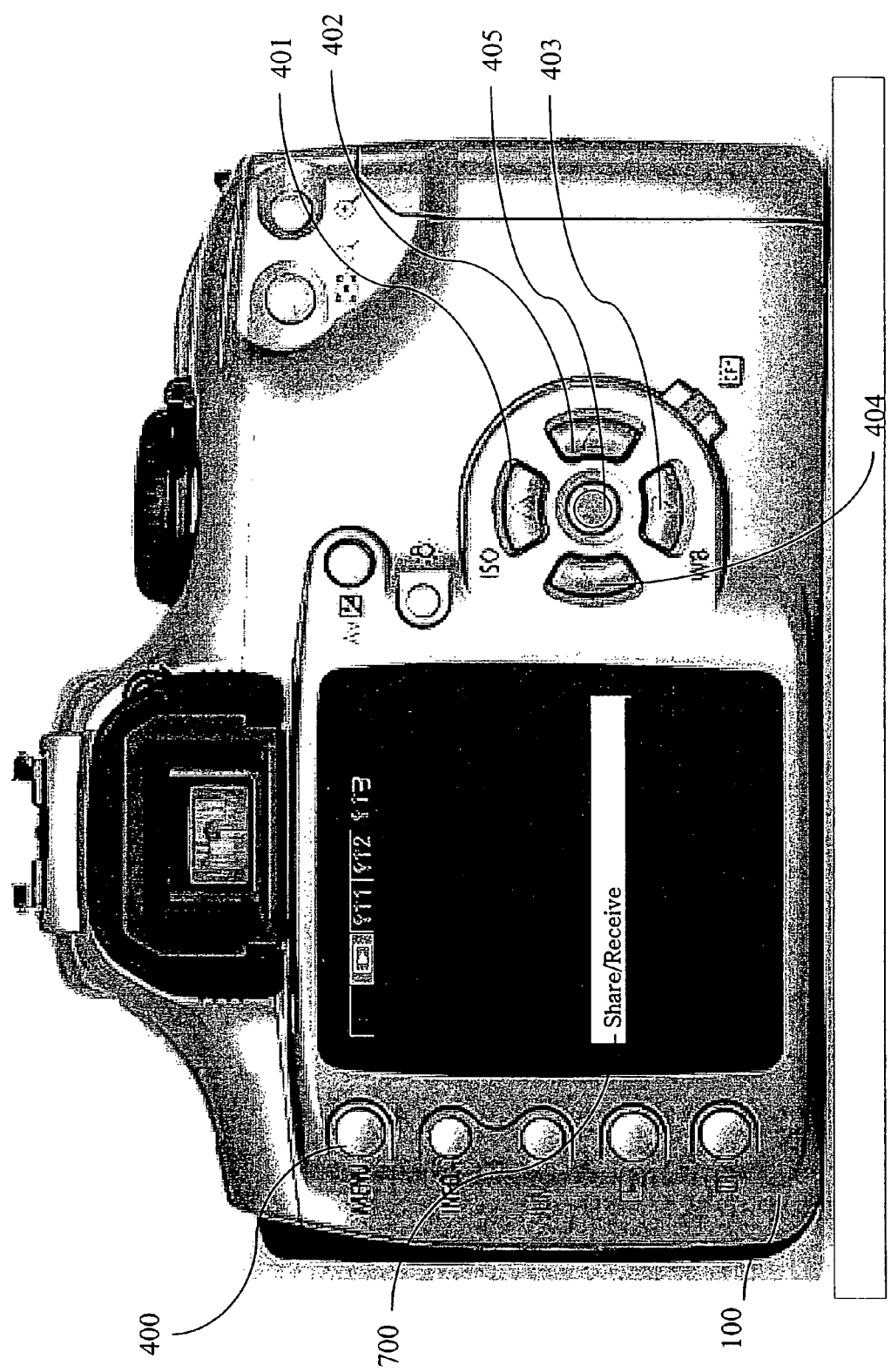

In FIG. 7, it is therefore seen that the user has selected two images, I2 and I3, by pressing the "SET" button 405 when the cursor was placed on the desired image. Once the image selection has been made, by pressing the menu button, the sharing or "Share/Receive" function 700 can be selected (FIG. 8).

Upon selection of this function, the process of dynamic creation of the address book is implemented as described in FIG. 3.

In FIG. 9, the recipients in the two lists are display. Thus, a visual representation of the recipients in the first list is displayed under the references U1, U2, U3, U4 and U5. A visual representation of the recipients in the second list is displayed here under the reference A1.

This displaying is carried out linearly from left to right and then from top to bottom.

The user navigates in these visual representations by means of the navigation buttons 401, 402, 403 and 404, and selects the recipients of the sharing by means of the selection button 405.

Thus, as depicted in FIG. 9, the visual representations can be photographs of the recipients, or photographs or illustrations of apparatuses. Other representations can of course be chosen. A name or number can also be associated with the visual representation to assist the user in identifying a recipient.

Thus, in FIG. 10, it is seen that the user has selected two recipients in the first list U2 and U5 and one recipient in the second list A1. Once this selection has been made, the user presses the "Send" button 800, depicted in FIG. 11.

The process of determining communication and sending modes described in FIG. 4 is then implemented. Once the sharing is finished, the display screen displays the first screen as illustrated in FIG. 5.

The invention claimed is:

1. A method of displaying a sequence for sharing digital data items with a set of recipients using a terminal that includes a digital camera and that uses at least two communication modes, the method comprising the steps of:
   obtaining a first list associated with a first communication mode, the first list identifying a first set of one or more recipients corresponding to one or more user entities communicating with the terminal according to the first communication mode via one or more electronic mail messages or one or more Multimedia Messaging Service (MMS) type of messages;
   obtaining a second list associated with a second communication mode, the second list identifying a second set of one or more recipients corresponding to one or more apparatus entities communicating wirelessly with the terminal according to the second communication mode, the first list not being the second list, and the first communication mode being different from the second communication mode;
   displaying at least one first representation of the first set of one or more recipients identified by the first list and at least one second representation of the second set of one or more recipients identified by the second list, merged on a same displaying area of the terminal, thereby generating a merged set of representations;
   selecting a selection of at least one representation from the merged set of representations;
   determining at least one selected recipient based on the selection;
   determining whether each of the at least one selected recipient is identified by the first list, or is identified by the second list;
   determining at least one communication mode to be used to transmit a data item to the at least one selected recipient, wherein the first communication mode is determined to be a communication mode to be used to transmit the data item to each of the at least one selected recipient determined to be identified by the first list, and the second communication mode is determined to be a communication mode to be used to transmit the data item to each of the at least one selected recipient determined to be identified by the second list; and
   sending the data item to the at least one selected recipient according to the at least one communication mode determined by the determining,
   wherein at least one of the steps above is performed, at least in part, by a computer processor.

2. The method according to claim 1, wherein the first list is obtained using a list of addresses and representations stored locally.

3. The method according to claim 1, wherein the obtaining of the second list includes searching for remote terminals accessible by the terminal.

4. The method according to claim 1, wherein the obtaining of the second list includes obtaining a representation of a remote terminal accessible by the terminal.

5. The method according to claim 1, wherein at least one representation is a photograph or an illustration of a corresponding recipient or a photograph or an illustration of an apparatus used by the corresponding recipient.

6. The method according to claim 1, wherein the first communication mode is of a type used by a messaging system on an Internet type of network.

7. The method according to claim 1,
wherein the first list is obtained from a first source;
wherein the second list is obtained from a second source; and
wherein the first source is different from the second source.

8. The method according to claim 1, further comprising deleting, from the first list, each recipient included in the first list and the second list.

9. The method according to claim 8,
wherein the obtaining of the second list includes searching for a plurality of recipients accessible by the terminal, and
wherein, when one or more recipients found by the searching match one or more recipients in the first list, the one or more recipients found by the searching are deleted from the first list.

10. A device that includes a digital camera and that shares digital data items with a set of recipients, the device being capable of using at least two communication modes, the device comprising:
a computer processor coupled to a memory unit,
wherein the processor is configured to obtain a first list associated with a first communication mode, the first list identifying a first set of one or more recipients corresponding to one or more user entities communicating with the device according to the first communication mode via one or more electronic mail messages or one or more Multimedia Messaging Service (MMS) type of messages,
wherein the processor is configured to obtain a second list associated with a second communication mode, the second list identifying a second set of one or more recipients corresponding to one or more apparatus entities communicating wirelessly with the device according to the second communication mode, the first list not being the second list, and the first communication mode being different from the second communication mode,
wherein the processor is configured to display at least one first representation of the first set of one or more recipients identified by the first list and at least one second representation of the second set of one or more recipients identified by the second list, merged on a same displaying area of the device, thereby generating a merged set of representations,
wherein the processor is configured to select a selection of at least one representation of a recipient from the representations of recipients merged on the same displaying area of the terminal,
wherein the processor is configured to determine at least one selected recipient based on the selection,
wherein the processor is configured to determine whether each of the at least one selected recipient is identified by the first list, or is identified by the second list;
wherein the processor is configured to determine at least one communication mode to be used to transmit a data item to the selected at least one recipient, wherein the first communication mode is determined to be a communication mode to be used to transmit the data item to each of the at least one selected recipient determined to be identified by the first list, and the second communication mode is determined to be a communication mode to be used to transmit the data item to each of the at least one selected recipient determined to be identified by the second list, and
wherein the processor is configured to send the data item to the selected at least one recipient according to the at least one communication mode determined by the processor.

11. The device according to claim 10, wherein the obtaining of the first list includes storing and retrieving addresses and representations of the recipients.

12. The device according to claim 10, wherein the obtaining of the second list includes searching for remote terminals accessible by the device.

13. The device according to claim 10, wherein the obtaining of the second list includes obtaining a representation of a remote terminal accessible by the terminal.

14. The device according to claim 10, wherein at least one representation is a photograph or an illustration of a corresponding recipient or a photograph or an illustration of an apparatus used by the corresponding recipient.

15. The device according to claim 10, wherein the first communication mode is of a type used by a messaging system on an Internet type of network.

16. The device according to claim 10, wherein the processor is configured to delete, from the first list, each recipient included in the first list and the second list.

17. The device according to claim 16,
wherein the processor is configured to perform a search for a plurality of recipients accessible by the terminal, and
wherein the processor is configured to delete one or more recipients found by the search from the first list, when the one or more recipients found by the search match one or more recipients in the first list.

18. The device according to claim 10, wherein the device is incorporated into a digital camera.

19. The device according to claim 10,
wherein the processor is configured to obtain the first list from a first source;
wherein the processor is configured to obtain the second list from a second source; and
wherein the first source is different from the second source.

20. A non-transitory computer-readable storage medium storing computer-executable instructions that, when executed by a computer that includes a digital camera, cause the computer to perform a method comprising:
obtaining a first list associated with a first communication mode, the first list identifying a first set of one or more recipients corresponding to one or more user entities communicating with a terminal according to the first communication mode via one or more electronic mail messages or one or more Multimedia Messaging Service (MMS) type of messages;
obtaining a second list associated with a second communication mode, the second list identifying a second set of one or more recipients corresponding to one or more apparatus entities communicating wirelessly with the terminal according to the second communication mode, the first list not being the second list, and the first communication mode being different from the second communication mode;

displaying at least one representation of the first set of one or more recipients identified by the first list and at least one second representation of the second set of one or more recipients identified by the second list merged on a same displaying area of the terminal, thereby generating a merged set of representations;

selecting a selection of at least one representation of a recipient from the merged set of representations merged on the same displaying area of the terminal;

determining at least one selected recipient based on the selection;

determining whether each of the at least one selected recipient is identified by the first list, or is identified by the second list;

determining at least one communication mode to be used to transmit a data item to the at least one selected recipient, wherein the first communication mode is determined to be a communication mode to be used to transmit the data item to each of the at least one selected recipient determined to be identified by the first list, and the second communication mode is determined to be a communication mode to be used to transmit the data item to each of the at least one selected recipient determined to be identified by the second list; and sending the data item to the at least one selected recipient according to the at least one communication mode determined by the determining.

* * * * *